Patented Dec. 6, 1938

2,139,115

UNITED STATES PATENT OFFICE 2,139,115

PROCESS FOR PRODUCING UNSATURATED ALCOHOLS

William Engs, Oakland, Henry W. de Jong, Berkeley, and Miroslav W. Tamele, Oakland, Calif., assignors to Shell Development Company, San Francisco, Calif., a corporation of Delaware No Drawing. Application April 3, 1937, Serial No. 134,926

16 Claims. (Cl. 260—640)

This invention relates to a process for making unsaturated alcohols from halogenated hydrocarbons having at least three carbon atoms in an aliphatic chain.

One object of this invention is to provide a more efficient and inexpensive process for producing unsaturated alcoholic bodies.

Another object of this invention is to provide a means of converting saturated polyhalides, and particularly dihalides, in part to valuable unsaturated alcohols.

It is the practice to subject to fractionation the mixed halogenated products resulting from the reaction of halogen with olefines in order to separate the unsaturated monohalides from saturated polyhalides prior to hydrolyzing the former to their respective alcohols. During fractionation, a decomposition reaction takes place liberating halogen acid, thus making it necessary, if corrosion is to be avoided, to use ceramic or glass lined equipment and in the case of halogenated higher olefines the halogen acid liberated is sufficient to make efficient fractionation difficult.

We have discovered that not only can the expense and corrosion problem incurred by the prior fractionation be eliminated but that a significant increase in yield of unsaturated alcohol, based on the unsaturated monohalides, can be obtained by hydrolyzing the crude mixtures resulting from the halogenation.

Numerous experiments have been made on the alkaline hydrolysis of olefine dihalides. The results have shown predominantly the formation of unsaturated halides of the vinyl type and under certain conditions the formation of fair amounts of saturated glycols. Since in most cases the investigators have concerned themselves with ethylene dihalides and only a few with propylene dihalides and still fewer with higher olefine dihalides, it is not surprising that the formation of unsaturated alcohols by similar methods has not been properly investigated.

We have found that under alkaline conditions of hydrolysis at elevated temperatures, olefine dihalides (ethylene dihalides excluded) are converted in part to unsaturated alcohols and that this conversion is significant and can be utilized.

According to the present invention, a product consisting substantially of olefine dihalides and unsaturated monohalides or substantially of olefine dihalides, with or without admixture with other unreacted or halogenated products (such as obtained by halogenation of an olefinic petroleum fraction or of a pure olefine or of a mixture of olefines) is hydrolyzed at an elevated temperature and pressure in the presence of a suitable basic-acting substance and a substantial quantity of water, the unsaturated alcohols being subsequently recovered from the reacted mixture or utilized in said mixture for further synthesis.

We have found our invention to be of the greatest advantage when treating materials containing substantial quantities of tertiary olefine dihalides.

The invention is preferably executed at a temperature of from about 80° C. to about 250° C. Temperatures below about 80° C. may be undesirable due to the slower reaction rate. Temperatures above about 250° C. may, in some cases, be advantageous providing that polymerization and decomposition reactions do not render the execution of the invention uneconomical. The optimum temperature is dependent upon the material to be treated. For example, if substantial quantities of 2,3-dichlorbutane are present excellent results may generally be obtained at temperatures from about 180° C. to about 225° C. Materials containing substantial quantities of tertiary olefine dihalides show appreciable reaction rates at lower temperatures, and propylene dihalides react at appreciable rates only at the higher temperatures.

The invention is best executed in the liquid phase, and this condition is maintained by using a pressure at least equal to the combined partial pressures of the constituents in the reaction mixture at the chosen temperature which minimum pressure we designate as the "autogenic pressure". If for any reason it is undesirable to execute the hydrolysis under this pressure, and if the material to be treated contains appreciable quantities of a constituent or constituents whose boiling points are lower than those of the reacting constituents concerned, it is generally possible to lower the working pressure by first removing said light boiling constituents. If pressures greater than that of the combined partial pressures of the constituents in the reaction mixture are desired, they may be produced by the application of suitable materials which are gaseous and substantially inert under the conditions in the system, such as, for example, methane, nitrogen, etc. Carbon dioxide may be applied if allowance is made for its acid character. The use of superatmospheric pressure also permits us to increase materially the rate of formation of unsaturated alcohol since temperatures greater than the atmospheric boiling temperature of the reaction mixture may be used. In general, expensive high-pressure equipment is unnecessary, since advantageous results may be obtained at moderately elevated pressures.

In order that our invention be operative to the maximum extent, it is necessary that the hydrolysis be executed in a basic medium. To insure the existence of this condition, we add to the reaction mixture a suitable basic-acting agent.

A suitable basic-acting agent is a material, which, under the conditions of execution of the invention, will react with all the acids, liberated or formed during the execution of the process, to neutralize the same, but which is not alkenylated to any substantial extent under the conditions of the hydrolysis.

Suitable basic-acting agents include the oxides, hydroxides, carbonates, bicarbonates and borates of the alkali forming metals, quaternary ammonium bases, such nitrogen bases as are not alkenylated to a substantial extent under the conditions of hydrolysis, and combinations of the same.

The basic-acting agent is used in an amount at least slightly in excess of that required to react and neutralize all the acid liberated or formed during the course of the reaction, and maintain an alkaline condition. Weak acting bases, weakly alkaline solutions of strong basic-acting agents or suspensions of basic-acting materials such as produce a mildly alkaline condition may be added in any desired excess.

Since on hydrolysis under strongly alkaline conditions, olefine dihalides react to give chiefly unsaturated chlorides of the vinyl type, it is preferable for the sake of better yields of unsaturated alcohols, to use such basic-acting agents as will maintain a mild alkalinity, or to use the strong basic-acting agents in such concentrations that the reacting mixture is only moderately alkaline.

The basic-acting agent may be introduced into the material to be hydrolyzed either previous to charging into the reaction vessel or directly into the reaction vessel either before or after the material to be hydrolyzed is charged thereto or it may be added continually or intermittently during the course of the reaction. If the basic-acting agent is sufficiently water soluble, it may be charged to the reaction vessel as an aqueous solution of the desired concentration. If the selected basic-acting agent is not easily soluble, it may be charged to the reaction vessel per se or as a paste or suspension in either water or in the material to be hydrolyzed. If a strong basic-acting agent is chosen, and if it is used per se or as strong basic solution, as for example, a 50% aqueous caustic soda solution, the method of introducing during the course of the reaction is preferred, since by this method the strong alkaline condition is avoided that would exist if the total required basic-acting agent were introduced essentially in one addition.

If the material to be treated contains substantial quantities of olefine monohalides and if it is desired to add the basic-acting agent in one addition, as is often the case in batch processes, satisfactory results may generally be obtained with the use of moderately strong basic-acting agents, as, for example, a 15% aqueous solution of caustic soda.

The amount of water used should be in excess of that required for the reaction and is preferably a substantial excess. Large amounts of water are detrimental to the execution of the invention only insofar as the handling, heating, etc., make the execution more costly. Such an amount of water as will enable adequate mixing, produce the desired alkalinity with the basic-acting agent used and facilitate temperature control is preferably chosen.

The invention may be executed in any suitable type of apparatus. For example, the material to be hydrolyzed, water and basic-acting agent in the desired proportions may be charged in any suitable manner to a suitable reaction vessel, as an autoclave, which is preferably equipped with appropriate heating and cooling means and means for agitating the reaction mixture.

Agitation of the reaction mixture is advantageous, as it promotes uniformity of conditions throughout the reacting mixture as regards alkalinity, temperature, etc., and thus decreases losses due to the formation of ethers, polymers and the like undesirable side reaction products.

Agitation may be effected through the use of mechanical devices, such as stirrers, paddles, circulation devices, etc., or may be effected by causing the mixture to flow through tubes equipped with baffle plates or orifices or by any means whatsoever as will produce intimate mixing of the reactants.

The invention may be executed in a batch, intermittent or continuous manner. If it is desired to dispense with the use of autoclaves equipped with mechanical stirring means, the invention may be executed advantageously in a continuous manner if desired, by utilizing a tubular reactor. The tubular reactor may comprise reaction tubes of the requisite size connected in series or in multiple through which the reaction mixture is caused to flow at the desired reaction temperature, rate and pressure. Throughout the length of the reaction tubes, orifice plates or baffles may be provided at such intervals as to maintain intimate mixing of the reactants.

The separation of the desired unsaturated alcohols from the reacted mixture may be accomplished by any suitable means, such as fractionation, extraction and the like. In some cases, where the unsaturated alcohol is an intermediate product, it may be desirable to subject the reacted mixture as such to further treatment.

The following specific examples illustrate suitable modes of execution and the advantages afforded by our invention. It is to be understood that the examples are submitted for the purpose of illustration only and are not to be regarded as limiting the invention as to the reactants, proportion of reactants, conditions of operation or modes of operation therein described.

*Example I*

About 9 gm. mols (1269 gm.) of tertiary amylene dichloride were charged to an autoclave equipped with heating and cooling means and means for agitating its contents by mechanical stirring. A lime slurry consisting of about 630 gm. calcium hydroxide and 5,000 gm. water was added to the contents of the autoclave; the autoclave sealed; the stirring mechanism started and the reaction mixture heated until it reached a temperature of about 150° C. The reaction temperature was maintained at about 150° C., with stirring and with the reaction mixture under its autogenic pressure, for 60 minutes. At the end of this time, the stirring mechanism was stopped; the reacted mixture cooled, and then discharged from the autoclave. About 4.6 gm. mol of a mixture of isopentenols were recovered from the reacted mixture by fractional distillation. This corresponds to a conversion of about 51%.

Example II

A mixture consisting of about—

| | Grams |
|---|---|
| Isobutylene dichloride | 1,270 |
| Calcium hydroxide | 740 |
| Water | 5,000 | when treated essentially as described in Example I yielded an appreciable quantity of isobutenol.

Example III

A mixture consisting of about—

| | | |
|---|---|---|
| Isobutylene dichloride | gm. mol | 2 |
| Sodium bicarbonate | gm. mol | 4 |
| Water | gm. | 1,500 | when stirred for about 90 minutes at about 120° C. under its autogenic pressure yielded about .657 gm. mol isobutenol.

Example IV

A mixture consisting of about—

| | | |
|---|---|---|
| 2,3 dichlorbutane | gm. mol | 3 |
| Sodium bicarbonate | gm. mol | 6.6 |
| Water | gm. | 2,000 | when stirred for about 110 minutes at about 180° C. under its autogenic pressure yielded an appreciable quantity of butene-1-ol-3.

Example V

About 3,000 gm. of a product obtained by chlorination of tertiary amylene, containing about

| | Per cent |
|---|---|
| Tertiary amylene | 1.4 |
| Tertiary amyl chloride | 3.6 |
| Unsaturated monochloride | 76.7 |
| Di- and tri-chlorides | 18.3 | were charged to an autoclave as described in Example I.

A slurry consisting of about 1,250 gm. calcium hydroxide and about 7,000 gm. water was added. The hydrolysis was carried out essentially as described in Example I. The yield of isopentenols obtained was about 1,772 gm., representing a conversion of about 93.6%.

A material having the polychlorides substantially removed, containing about

| | Per cent |
|---|---|
| Dichloride | 3.8 |
| Tertiary amyl chloride | 6.7 |
| Unsaturated monochlorides | 89.5 | when treated essentially as above described, yielded when calculated on the same basis a conversion to the desired unsaturated alcohols of only about 86%.

Example VI

A crude chlorinated butylene mixture containing about

| | Per cent |
|---|---|
| Butylene | 7.0 |
| Tertiary butyl chloride | 0.7 |
| Isocrotyl chloride | 4.7 |
| Isobutenyl chloride | 68.7 |
| Dichlorides and higher chlorides | 18.9 | yielded, when treated as described in Example V, a conversion to isobutenol of 90.7%, based on the isobutenyl chloride charged.

A material from which the polychlorides had been removed, containing about

| | Per cent |
|---|---|
| Isobutenyl chloride | 93.6 |
| Isocrotyl chloride | 6.4 | when treated as above described, yielded on the same basis only 81.4% isobutenol.

Although the examples stress the various chlorides it is to be understood that the corresponding bromides and iodides behave similarly.

The polyhalides which we have in mind are those which have at least three carbon atoms in an aliphatic chain of which two are halogenated and the third contiguous carbon atom is linked to at least one hydrogen atom.

While we have described our invention in a detailed manner and provided specific examples illustrating suitable modes of executing the same, it is to be understood that modifications may be made and that no limitations other than those imposed by the scope of the appended claims are intended.

We claim as our invention:

1. A process for the production of unsaturated alcoholic bodies from saturated polyhalides having at least three carbon atoms in an aliphatic chain of which two contiguous carbon atoms are halogenated and the contiguous third carbon atom is linked with at least one hydrogen atom, which comprises heating said polyhalides with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

2. A process for the production of unsaturated alcoholic bodies from saturated polychlorides having at least three carbon atoms in an aliphatic chain of which two contiguous carbon atoms are chlorinated and the contiguous third carbon atom is linked with at least one hydrogen atom, which comprises heating said polychlorides with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

3. A process for the production of unsaturated alcoholic bodies from saturated dihalides having at least three carbon atoms in an aliphatic chain of which two contiguous carbon atoms are halogenated and the contiguous third carbon atom is linked with at least one hydrogen atom, which comprises heating said dihalides with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

4. A process for the production of unsaturated alcoholic bodies from saturated dichlorides having at least three carbon atoms in an aliphatic chain of which two contiguous carbon atoms are chlorinated and the contiguous third carbon atom is linked with at least one hydrogen atom, which comprises heating said dichlorides with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

5. A process for the production of an unsaturated alcohol from a pentene dihalide which comprises heating said pentene dihalide with more than the stoichiometric amount of water and a basic-acting agent in an amount at least sufficient to maintain an alkaline condition during the reaction under a pressure at least equal to the autogenic pressure and at a temperature above 80° C. but below that at which substantial polymerization occurs, and removing the unsaturated alcohol from the reaction system.

6. A process for the production of an unsaturated alcohol from an isopentene dihalide which comprises heating said isopentene dihalide with more than the stoichiometric amount of water and a basic-acting agent in an amount at least sufficient to maintain an alkaline condition during the reaction under a pressure at least equal to the autogenic pressure and at a temperature above 80° C. but below that at which substantial polymerization occurs, and removing the unsaturated alcohol from the reaction system.

7. A process for the production of an unsaturated alcohol from an isopentene dichloride which comprises heating said isopentene dichloride with more than the stoichiometric amount of water and a basic-acting agent in an amount at least sufficient to maintain an alkaline condition during the reaction under a pressure at least equal to the autogenic pressure and at a temperature above 80° C. but below that at which substantial polymerization occurs, and removing the unsaturated alcohol from the reaction system.

8. A process for the production of an unsaturated alcohol from a butylene dihalide which comprises heating said butylene dihalide with more than the stoichiometric amount of water and a basic-acting agent in an amount at least sufficient to maintain an alkaline condition during the reaction under a pressure at least equal to the autogenic pressure and at a temperature above 80° C. but below that at which substantial polymerization occurs, and removing the unsaturated alcohol from the reaction system.

9. A process for the production of unsaturated alcohols from a mixture of halogenated products containing a butene monohalide and a butylene dihalide which comprises heating said mixture of halogenated products with more than the stoichiometric amount of water and a basic-acting agent in an amount at least sufficient to maintain an alkaline condition during the reaction under a pressure at least equal to the autogenic pressure and at a temperature above 80° C. but below that at which substantial polymerization occurs, and removing the unsaturated alcohols from the reaction system.

10. A process for the production of unsaturated alcohols from a mixture of halogenated products containing pentenyl halide and pentene dihalide which comprises heating said mixture of halogenated products with more than the stoichiometric amount of water and a basic-acting agent in an amount at least sufficient to maintain an alkaline condition during the reaction under a pressure at least equal to the autogenic pressure and at a temperature above 80° C. but below that at which substantial polymerization occurs, and removing the unsaturated alcohols from the reaction system.

11. A process for the production of unsaturated alcoholic bodies from a mixture of halogenated products containing a saturated polyhalide having at least three carbon atoms in an aliphatic chain of which two carbon atoms are halogenated and the contiguous third carbon atom is linked with at least one hydrogen atom, and an unsaturated monohalide, which comprises heating said mixture of halogenated products with more than the stoichiometric amount of water, under a pressure at least equal to the autogenic pressure and under alkaline conditions, at a temperature above 80° C. but below that at which substantial polymerization occurs, and removing the unsaturated alcoholic bodies from the reaction system.

12. A process for the production of unsaturated alcoholic bodies from saturated aliphatic hydrocarbon dihalides having at least three carbon atoms of which two contiguous carbon atoms are halogenated and the contiguous third carbon atom is linked to at least one hydrogen atom, which comprises heating said aliphatic hydrocarbon dihalides in intimate admixture with more than the stoichiometric amount of water and a basic-acting agent in an amount at least sufficient to maintain an alkaline condition during the reaction, under a pressure at least equal to the autogenic pressure and in a state of agitation at a temperature above 80° C. but below that at which substantial polymerization occurs, and removing the unsaturated alcoholic bodies from the reaction system.

13. A process for the production of an unsaturated alcohol from a tertiary olefine dihalide, which comprises heating said tertiary olefine dihalide with more than the stoichiometric amount of water and a basic-acting agent in an amount at least sufficient to maintain an alkaline condition during the reaction, under a pressure at least equal to the autogenic pressure and at a temperature above 80° C. but below that at which substantial polymerization occurs, and removing the unsaturated alcohol from the reaction system.

14. A process for the production of unsaturated alcoholic bodies which comprises heating the mixture of halogenated compounds obtained from the halogenation of aliphatic olefine hydrocarbons and containing a substantial quantity of an unsaturated monohalide with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

15. A process for the production of unsaturated alcoholic bodies which comprises heating the mixture of chlorinated compounds obtained from the chlorination of aliphatic olefine hydrocarbons and containing a substantial quantity of an unsaturated monochloride with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

16. A process for the production of unsaturated alcoholic bodies which comprises heating the mixture of chlorinated compounds obtained from the chlorination of a butylene petroleum fraction and containing a substantial quantity of chlorobutene with more than the stoichiometric amount of water under a pressure at least equal to the autogenic pressure and under alkaline conditions at a temperature above 80° C. but below that at which substantial polymerization occurs, and removing the unsaturated alcoholic bodies from the reaction system.

WILLIAM ENGS.
HENRY W. DE JONG.
MIROSLAV W. TAMELE.